(12) United States Patent
Floyd (10) Patent No.: US 6,715,876 B2
(45) Date of Patent: Apr. 6, 2004

(54) LENS ARRANGEMENT WITH FLUID CELL AND PRESCRIPTIVE ELEMENT

(76) Inventor: Johnnie E. Floyd, 3606 Spotted Horse Trail, Austin, TX (US) 78739

( * ) Notice: Subject to any disclaimer, the term of this patent is extended or adjusted under 35 U.S.C. 154(b) by 157 days.

(21) Appl. No.: 10/001,867

(22) Filed: Nov. 19, 2001

(65) Prior Publication Data

US 2003/0095336 A1 May 22, 2003

(51) Int. Cl.⁷ .............. G02C 7/06; G02B 1/06; G02B 3/12
(52) U.S. Cl. ............... 351/159; 351/172; 359/666
(58) Field of Search ............... 351/159, 158, 351/168–172; 359/665, 666, 667

(56) References Cited

U.S. PATENT DOCUMENTS

| | | |
|---|---|---|
| 1,269,422 A | 6/1918 | Gordon |
| 2,576,581 A | 11/1951 | Edwards |
| 2,836,101 A | 5/1958 | De Swart |
| 3,031,928 A | 5/1962 | Kopito |
| 3,161,718 A | 12/1964 | De Luca |
| 3,598,479 A | 8/1971 | Wright |
| 3,614,215 A | 10/1971 | Mackta |
| 4,174,156 A | 11/1979 | Glorieux |
| 4,181,408 A | 1/1980 | Senders |
| 4,261,655 A | 4/1981 | Honigsbaum |
| 4,444,471 A | 4/1984 | Ford, Jr. et al. |
| 4,466,706 A | 8/1984 | Lamothe, II |
| 4,477,158 A | 10/1984 | Pollock et al. |
| 4,732,458 A | 3/1988 | Zambelli |
| 4,890,903 A * | 1/1990 | Treisman et al. ........... 359/666 |
| 5,138,494 A | 8/1992 | Kurtin |
| 5,371,629 A | 12/1994 | Kurtin et al. |
| 5,668,620 A | 9/1997 | Kurtin et al. |
| 5,684,637 A | 11/1997 | Floyd |
| 5,956,183 A * | 9/1999 | Epstein et al. ............ 359/666 |

FOREIGN PATENT DOCUMENTS

JP     60-6901 A     1/1985

OTHER PUBLICATIONS

"Optics Liquid Lens", Popular Science, May 1994, p. 36.
"Liquid Lens . . . ", The Surveyors, vol. 3, No. 4, (1967) p. 26.
J.C. Edwards, "Variable Curvature Fluid Lens", IBM Technical Disclosure Bulletin, vol. 24, No. 1B, Jun. 1981, p. 572.

* cited by examiner

Primary Examiner—Scott J. Sugarman
(74) Attorney, Agent, or Firm—Geoffrey A. Mantooth (57) ABSTRACT

A lens arrangement has a corrective or prescription lens. The prescription lens is adjacent to a fluid cell. The fluid cell has a flexible membrane and a base. Fluid is pumped into or out of the fluid cell in order to vary the corrective power of the entire lens arrangement. The prescription lens is coupled to the base so as to pivotally couple an edge portion of the flexible membrane therebetween and to allow the edge portion to flex with minimum distortion. The prescription lens, which may have a cylindrical surface, is rotatably coupled to the base to allow the cylinder axis to be adjusted to a proper position. The prescription lens is removably coupled to the base to allow the lens to be exchanged for a lens with a different corrective power.

29 Claims, 9 Drawing Sheets

LENS ARRANGEMENT WITH FLUID CELL AND PRESCRIPTIVE ELEMENT

FIELD OF THE INVENTION

The present invention relates to lens arrangements used to provide correction to eyes.

BACKGROUND OF THE INVENTION

Many people have trouble seeing clearly as they get older. The common solution is to wear corrective lenses, whether the lenses are supported on the nose by a frame or else in contact with the eyes.

Corrective lenses work by providing the proper focus of the image for the eye. Much of the eyewear in use has only a single lens in front of the eye. Many people require two or more lenses. Hence the use of bifocals and trifocals. A pair of bifocals allows the user to look relatively far away (for example to drive) and also allows the user to look fairly close (for example to read). Thus, bifocals provide two focal lengths for the wearer, with each lens providing the respective focal length.

The problem with conventional eyewear is that the lens is fixed at its respective focal length. Some people do not wear bifocals, so they have two pairs of eyeglasses. One pair is for up close reading and the other pair is for looking relatively far away.

Also, the amount of correction needed typically changes throughout one's life. This change can be either gradual or more dramatic. For example, diabetics may find that their eyes change focal length throughout each day, due to the fluctuation of blood sugar. In the morning, their eyes are at one focal length while in the afternoon, the focal length is changed.

Frequent updating of a corrective lens can be expensive.

SUMMARY OF THE INVENTION

It is an object of the present invention to provide a lens that allows for the corrective power to be easily changed, without the need to replace the entire lens.

It is another object of the present invention to provide a lens having a fluid cell for adjustment of corrective power, which lens can be mounted into conventional eyewear frames.

It is another object of the present invention to provide a lens having a fluid cell, which lens allows the replacement or adjustment of a corrective element.

It is another object of the present invention to provide a lens having a fluid cell, which fluid cell produces a minimum corrective power when fluid pressure is lost.

The present invention provides a lens arrangement for use in applying a corrective power. The lens arrangement includes a fluid lens cell formed by first and second lens elements. The chamber is sealed by a seal and contains a transparent fluid. The first and second lens elements are made of transparent material. One of the first or second lens elements is flexible. A passage is coupled to the fluid lens cell so as to allow communication with the chamber. The passage provides for the flow of the fluid therethrough so that the volume of the chamber can be changed. There is a rigid third lens element having first and second surfaces that are shaped to provide optical correction. The third lens element is removably coupled to an exterior of the fluid cell so as to be adjacent to the fluid cell and optically aligned with the fluid cell.

In accordance with one aspect of the present invention, the fluid cell is capable of providing a null correction. In accordance with another aspect of the present invention, the fluid cell provides a null correction when the flexible first or second lens element is unflexed.

In accordance with another aspect of the invention, at least one of the first or second lens elements comprises a negative lens. This provides a fail safe mode should the fluid be drained from the cell so that the wearer will have far vision.

In accordance with still another aspect of the present invention, the flexible one of the first or second lens elements comprises a membrane. The membrane has an edge portion and a center portion, with the edge portion being pivotally coupled to an annular member between the first and second lens elements, wherein the center portion of the membrane can flex.

In accordance with another aspect of the present invention, the flexible one of the first or second lens elements comprises a membrane. The third lens element is adjacent to the membrane, there being a space between the third lens element and the membrane to allow the membrane to flex.

In accordance with still another aspect of the present invention, one of the first or second surfaces of the third lens element is spherical and the other of the first or second surfaces is cylindrical.

In accordance with still another aspect of the present invention, one of the first or second surfaces of the third lens element is cylindrical, and has a cylindrical axis. The third lens element is rotatable relative to the fluid cell so as to vary the cylindrical axis orientation.

In accordance with still another aspect of the present invention, the first and second lens elements each have two surfaces, with at least one of the surfaces of the first, second or third lens element being coated, shaded or polarized.

In accordance with another aspect of the present invention, the flexible one of the first or second lens elements includes a membrane. The membrane has two flat surfaces.

In accordance with another aspect of the present invention, the flexible one of the first or second lens elements comprises a membrane, the membrane having two surfaces, with one of the membrane surfaces being curved.

In accordance with still another aspect of the present invention, the third lens element is coupled to the fluid cell independently of the fluid lens seal, wherein the third lens element can be removed from the lens arrangement without disturbing the seal.

In accordance with still another aspect of the present invention, the third lens element is rotatably coupled to the fluid cell.

In accordance with still another aspect of the present invention, the third lens element includes a prescription lens. The third lens element is coupled to the fluid cell by way of an adapter which is structured and arranged for receiving the third lens element.

The present invention provides a lens arrangement for use in applying a corrective power. The lens arrangement includes a base, a flexible membrane, and a corrective lens element. The base has first and second surfaces. The flexible membrane has third and fourth surfaces, with the second surface of the base and the third surface of the membrane being adjacent to each other and forming a chamber therebetween. The membrane has an edge portion and a center portion. The edge portion being coupled to the base wherein the center portion can flex. The chamber is sealed and contains a transparent fluid. The base and the membrane are made of transparent materials and form a fluid cell. A passage communicates between the chamber and the exterior of the fluid cell so as to allow the amount of fluid within the chamber to be changed. The corrective lens element has fifth and sixth surfaces that are shaped to provide optical correction. The corrective lens element is removably coupled to the base so as to be adjacent to the fluid cell.

In accordance with one aspect of the present invention, the corrective lens element is rotatably coupled to the base.

In accordance with another aspect of the present invention, one of the fifth or sixth surfaces of the corrective lens element is spherical and the other of the fifth or sixth surfaces is cylindrical.

In accordance with still another aspect of the present invention, the corrective lens element is coupled to the base by way of a ring member. The membrane edge portion is pivotally coupled between the base and the ring member.

In accordance with another aspect of the present invention, the corrective lens element is adjacent to the membrane.

In accordance with still another aspect of the present invention, one of the third or fourth surfaces of the membrane is spherical.

In accordance with still another aspect of the present invention, the first and second surfaces of the base, the fluid and the third and fourth surfaces of the membrane form a null correction when the membrane is in an unflexed position.

In accordance with still another aspect of the present invention, the base comprises a negative lens. This provides a fail safe mode should the fluid cell lose fluid, so that the wearer will have far vision.

In accordance with still another aspect of the present invention, the base is mounted into an eyewear frame.

The present invention also provides an arrangement of lenses comprising a first lens and a second lens. Each of the first and second lenses comprise a fluid lens cell having a chamber formed by first and second lens elements. The chamber is sealed by a seal and contains a transparent fluid. The first and second lens elements are made of a transparent material. One of the first or second lens elements is flexible. Each of the first and second lenses comprise a passage coupled to the fluid lens cell so as to allow communication with the chamber. The passage provides for flow of the fluid therethrough so that the volume of the chamber can be changed. The passage communicates with a fluid pump and the pump is controlled by a controller. One of the first lens controller or the second lens controller selectively controls one or both of the first lens pump and the second lens pump.

In accordance with another aspect of the present invention, each of the first and second lenses comprise a rigid third lens element having first and second surfaces that are shaped to provide optical correction. The third lens element is removably coupled to an exterior wall of the respective fluid cell so as to be adjacent to the fluid cell and optically aligned with the fluid cell.

DESCRIPTION OF THE PREFERRED EMBODIMENTS

Figure 1:
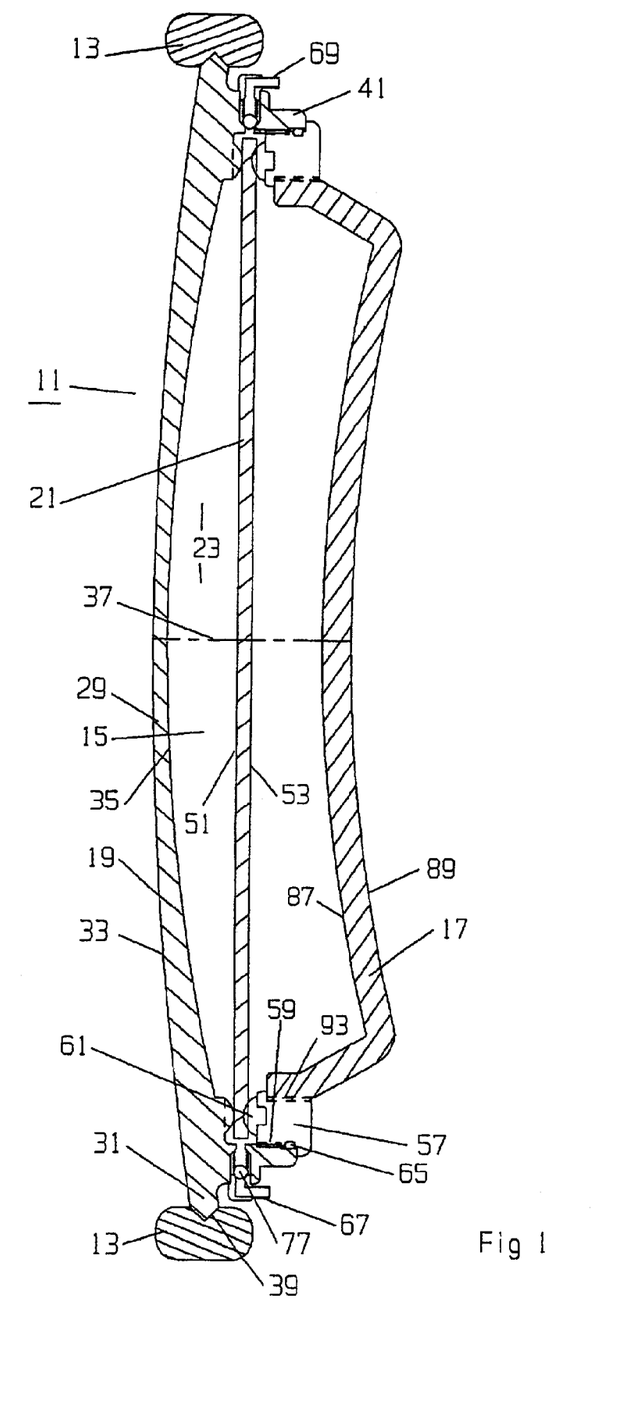
FIG. 1 is a cross-sectional view of the lens arrangement of the present invention, in accordance with a preferred embodiment.
Figure 2:
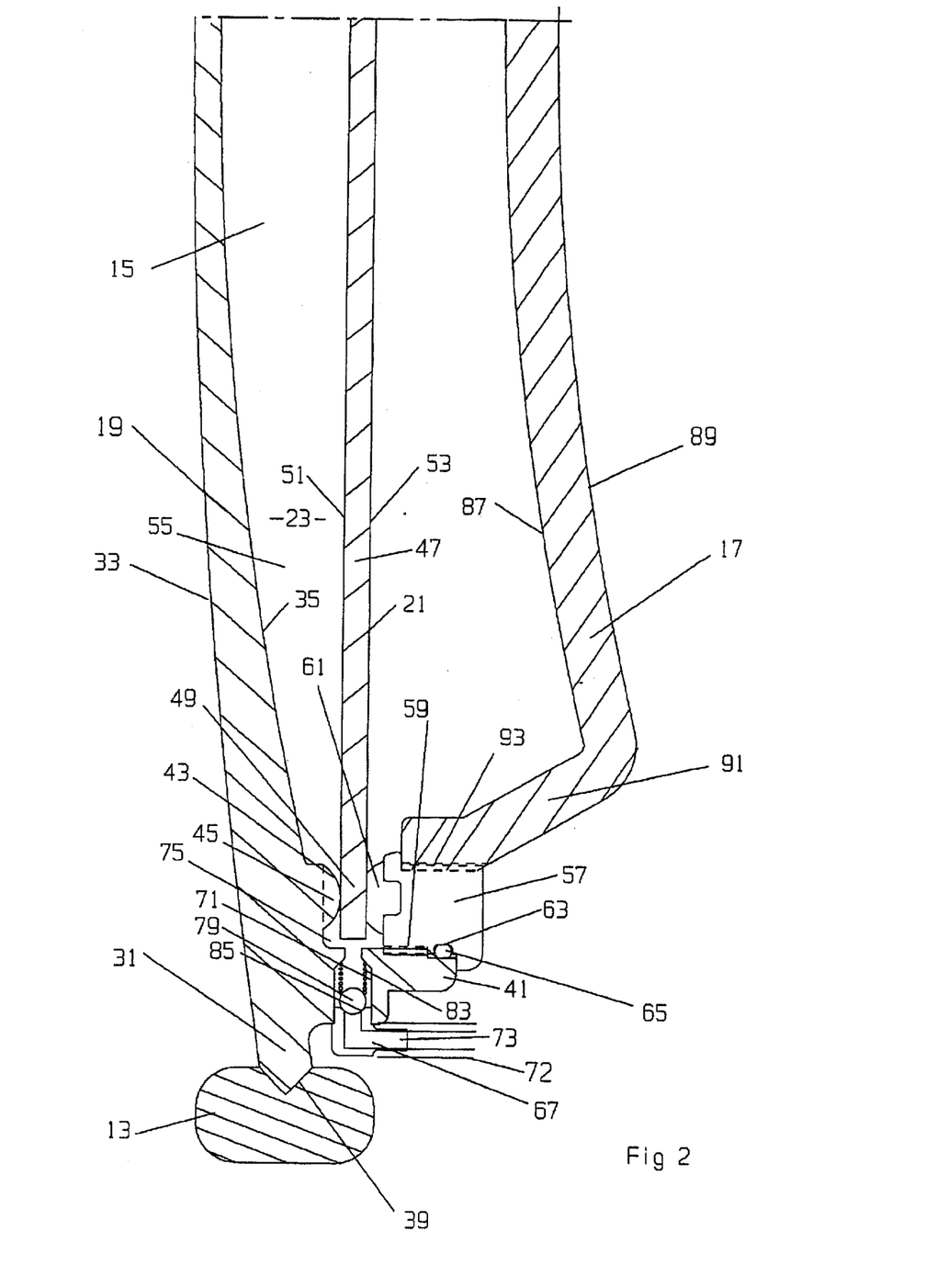
FIG. 2 is a cross-sectional detail view of the outer periphery of the lens arrangement of FIG. 1.

In FIGS. 1 and 2, there are shown cross-sectional views of the lens arrangement 11 of the present invention. The lens arrangement can be used in conventional eyewear such as a frame 13. The lens arrangement can be used in a variety of other devices as well, such as goggles, shields, instruments, etc. The lens arrangement 11 has a corrective lens element 17 in the form of a prescription lens. The prescription lens 17 provides a fixed corrective power to the user.

The corrective power of the lens 17 can be altered by a fluid cell 15 which is located adjacent to the lens 17. The fluid cell has a flexible membrane 21 which changes curvature depending on the amount of fluid within the fluid cell. The fluid 23 inside of the fluid cell 15 acts as a lens element, with one of its boundaries being the adjustable membrane 21. The membrane 21 can flex either toward the prescription lens 17 or away from the prescription lens. In a sense, the fluid cell can either add or subtract power to and from the prescription lens 17. The addition or subtraction of power is to the combination lens arrangement; the lens 17 itself is unmodified.

In an eyeglass frame 13, there are two lens arrangements 11 provided, one for each eye. Each lens arrangement 11 can be focused independently of the other.

In addition, the prescription lens 17 is removably coupled to the fluid cell 15. Thus, the prescription lens can be changed and replaced with another prescription lens having a different corrective power. Furthermore, the prescription lens can be rotated relative to the fluid cell and to the eyewear frame 13. This is useful if the prescription lens has a cylindrical surface, wherein the axis of the cylinder can be adjusted to correct an astigmatism. Furtherstill, the prescription lens 17 can be changed or rotated without affecting the fluid cell. This is because the fluid does not wet the prescription lens. Instead, the fluid cell is separate from the prescription lens.

The lens arrangement 11 will now be described in more detail. The lens arrangement 11 has the fluid cell 15, the prescription lens 17, a pump 25L, 25R (see FIG. 8) and a controller 27L, 27R for the pump.

The lens arrangement uses many of the features of the lens cell of Floyd, U.S. Pat. No. 5,684,637, the entire disclosure of which is incorporated herein. For example, in the '637 patent, there is disclosed structure for supporting the edge of a flexible membrane in a fluid cell. This support structure is used herein.

Referring back to FIGS. 1 and 2, the fluid cell 15 includes a base 19 and a membrane 21. The base 19 has a center portion 29 and an edge portion 31. The base 19 has a first surface 33 and a second surface 35. The base 19 also has a central axis 37 that extends through the center portion 29 and the first and second surfaces 33, 35. The first surface 33 forms an exterior surface of the overall lens arrangement 11.

The edge portion 31 of the base 19 can be ground and beveled 39 as shown so as to mount the base into an eyewear frame 13. The frame 13 is conventional and commercially available. Consequently, the circumference of the base 19 may be noncircular so as to fit properly within the frame.

Referring to FIG. 2, the base 19 has a lip 41 that extends in an axial direction from the side of the base with the second surface 35. The lip 41 is located around the edge portion 31 of the base and is ring shaped, as it extends around the circumference of the base. The lip 41 can be circular, or it can approximate the shape of the edge portion 31 (for example oval, irregular, etc.).

Located interiorly of the lip 41 is a projection 43. The projection 43 is also ring shaped. In cross-section, as shown in FIG. 2, the projection 43 is rounded. Alternatively, the projection can be somewhat pointed. The projection is used to reduce the bending moment on the edge portion of the membrane 21, as discussed in more detail in Floyd, U.S. Pat. No. 5,684,637. Grooves or slots 45 are formed in the projection 43, in order to 19 allow the fluid 23 to traverse therethrough. Thus, the contact between the projection 43 and the membrane 21 need not be fluid tight. The grooves 45 are at various locations in the ring shaped projection 43.

The base 19 is made of a transparent material, such as plastic or glass, that is suitable for use in eyewear. The base can be molded, wherein the first and second surfaces 33, 35 can be polished to provide optical clarity. Alternatively, the base can be machined, or a combination of molded and machined.

The membrane 21 is flexible and has a center portion 47 and an edge portion 49. The circumference of the membrane 21 is large enough so that the membrane edge portion 49 contacts the base projection 43 and even extends slightly beyond. Thus, the membrane edge portion contacts the projection 43 all around its circumference (with the exception of the grooves 45 of the projection).

The membrane 21 has a third surface 51 and a fourth surface 53. The third surface 51 of the membrane 21 faces the second surface 35 of the base. A chamber 55 is formed between the second and third surfaces 35, 51, which chamber is filled with the fluid 23.

Figure 7:
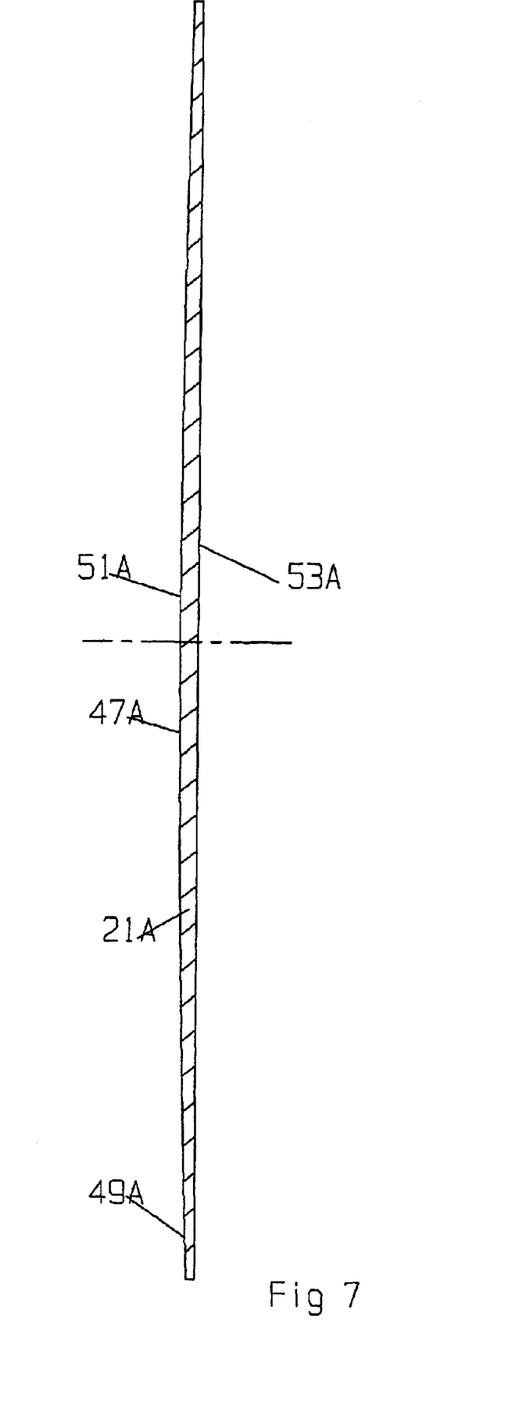
FIG. 7 is a cross-sectional view of a membrane, in accordance with another embodiment.

The membrane third and fourth surfaces 51, 53 can be either flat (plano) or curved. For example, FIGS. 1 and 2 show the membrane third and fourth surfaces 51, 53 as being flat. FIG. 7 shows another membrane 21A in a cross-section, which has a curved third surface 51A and a flat fourth surface 53A. Either the third or the fourth surface, or both, could be curved. The curvature could be spherical, which is generally accepted in the optical industry. Alternatively, the curvature could approximate spherical (for example by a parabolic curve) or some other shape. The membrane 21A of FIG. 7 has a curvature such that the center portion 47A is thicker in cross-section than the edge portion 49A. By controlling the membrane thickness at selected distances from a membrane centerline, the inherent membrane refraction, combined with the resulting membrane deflections, can form a variety of useful fluid lenses.

The membrane 21, 21A is made of a transparent material such as plastic. The membrane can be made by many processes (such as molding) and from many materials, as long as the membrane is transparent when used in the refractive mode, and is flexible, generally having an elastic modulus less than $1.5*10^6$ psi.

Referring again to FIG. 2, there is also a ring member 57 that is used to secure the membrane 21 and provide a seal for the fluid 23. The ring member 57 is ring shaped, generally conforming to the shape of the base lip 41. The ring member 57 is coupled to the base lip 41. In FIG. 1, the coupling is accomplished with threads 59. In this embodiment, the threaded surfaces of the ring member 57 and the base lip 41 are circular.

A seal 61 is provided on the ring member 57 to contact the membrane edge portion 49, all around the circumference of the membrane 21. The seal 61 is round in cross-section before assembly. After assembly into the base 19, the seal 61 flattens against the membrane 21, as shown in FIG. 2.

When the ring member 57 is threaded into the base 19, the membrane edge portion 49 is captured between the seal 61 and the projection 43. The center portion 47 of the membrane is free to flex. In addition, the edge portion 49 is also free to flex with the center portion 47. The seal 61 and the projection 43 minimize any distortion at the edge portion 49 of the membrane 21, which distortion usually arises when the membrane edges are fixed and unmovable. With the fluid cell of FIG. 1, the edge portion pivots when the center portion of the membrane flexes. The seal 61 also prevents the fluid from leaking out of the fluid cell, as it provides a fluid tight seal against the fourth surface 53.

Figure 3:
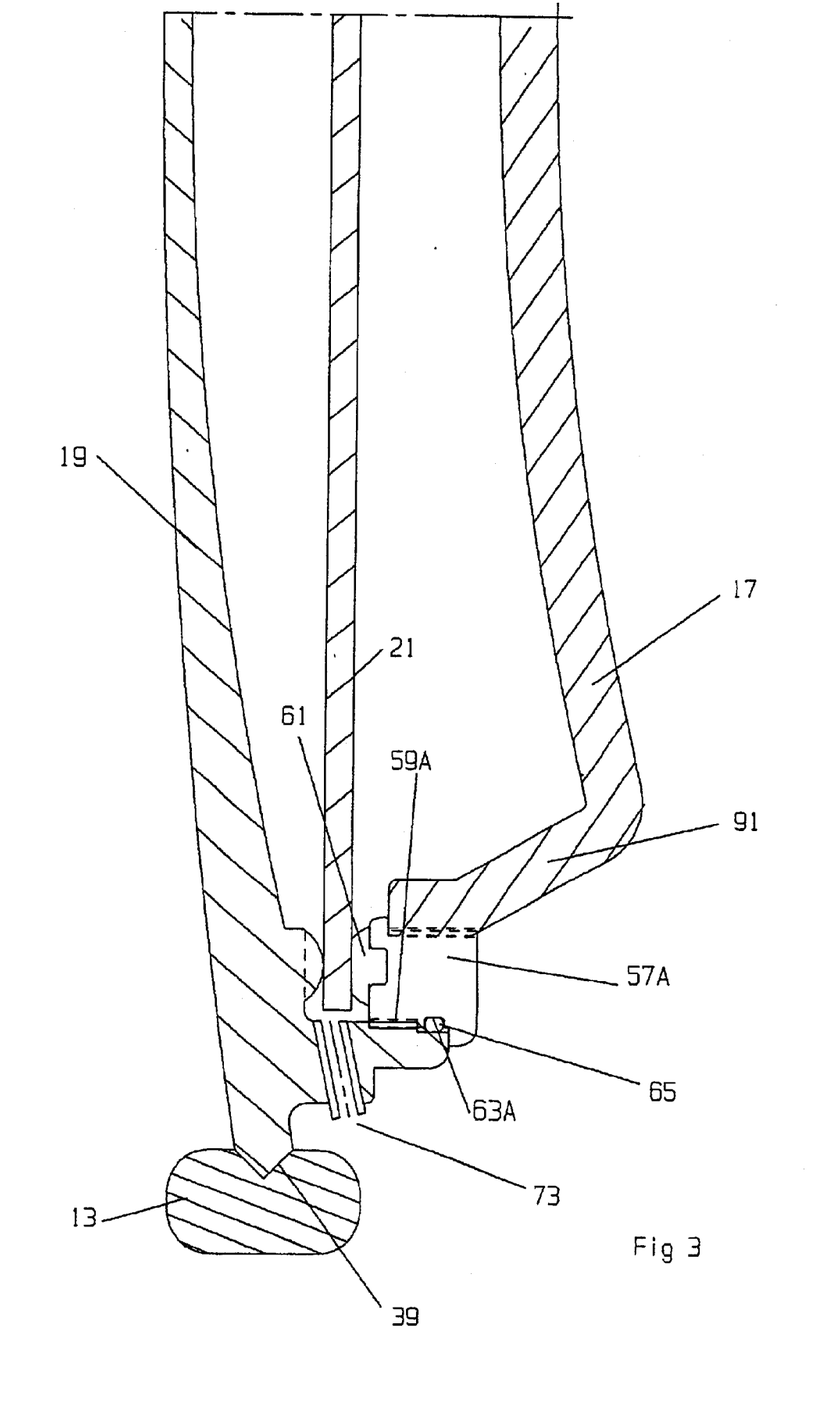
FIG. 3 is a cross-sectional detail view of the lens arrangement, in accordance with another embodiment.

The ring member 57 is equipped with a groove 63 and an o-ring 65 therein to completely seal the fluid cell. The o-ring 65 can be positioned such that the threads 59 are wetted by the fluid (FIGS. 1 and 2) or the threads 59A are kept dry (see FIG. 3).

The fluid 23 that is used inside of the fluid cell is transparent and has a viscosity to allow for ease of movement in and out of the cell. The fluid could be water. The water can have an amount of alcohol added to lower its freezing point. Other fluids that could be used include mineral oil, glycerin, silicon, etc.

The fluid is moved in and out of the fluid cell by way of passages 67, 69 (see FIG. 1). In the preferred embodiment, two passages are provided. The fluid enters the cell via an inlet passage 67 and exits through the other, or outlet, passage 69. The provision of two passages simplifies the removal of any gas that might enter the fluid cell, which fluid cell contains liquid as the fluid of choice. The gas can be removed through the outlet passage 69.

The passages 67, 69 penetrate the base lip 41 and are preferably spaced apart from each other. The passages need not be spaced 180 degrees apart. Each passage 67, 69 can include an opening 71 in the base lip 41, which opening receives a tube 73 (see FIG. 2, which shows the inlet passage 67 in detail). The tube 73 extends from the fluid cell 15 to the pump. Each passage communicates with the fluid cell chamber 55 by a circumferential antechamber 75, which is located radially outward of the seal 61 and the projection 43. The antechamber 75, which extends around the membrane, communicates with the fluid cell chamber 55 by the grooves 45. Thus, fluid 23 flows through the tube 73, the opening 71, into the antechamber 75, and once in the antechamber, flows around a portion of the circumference of the projection 43 and through one or more grooves 45 into the fluid chamber 55. To exit the chamber, the fluid follows a similar path via the outlet passage 69.

The tubes 23 are formed by respective fittings 70. Flexible tubing 22 is attached to each fitting and conveys fluid to and from the pump 25.

A one way check valve 77 (see FIG. 1) can be provided in each passage 67, 69. Each check valve comprises a ball 79 that is contained inside of the opening 71. A spring 83 urges the ball 79 into a valve seat 85. The check valves in the passages 67, 69 are similar to one another, except that ball and spring positions are interchanged. The inlet passage 67 has a check valve arranged to allow fluid to flow into the antechamber 75, while the outlet passage 69 has a check valve arranged to allow fluid to flow out of the antechamber into the tube. The check valves can be contained either within the base 19 or closer to the pump.

The prescription lens 17 has fifth and sixth surfaces 87, 79. The fifth surface 87 is adjacent to the membrane fourth surface 53. The fifth and sixth surfaces 87, 89 are formed to provide the necessary corrective power to the wearer. Most corrective lens provide a spherical surface. Either one of, or both of, the fifth or sixth surfaces can be spherical. If the lens is to correct for astigmatism, then the other of the fifth or sixth surfaces is cylindrical, in accordance with modern conventional lens design. Because it is industry practice to provide that the surface closer to the wearer's eye is cylindrical, while the other surface is spherical, that same practice is followed in the preferred embodiment, such that the fifth surface 87 is spherical, while the sixth surface 89 is cylindrical. In the optical industry, a spherical surface need not be a true sphere. For example, a surface can be aspheric, with more curvature in the middle of the lens and less curvature at the edges. Also, a cylindrical surface could be toric. As used herein, spherical and cylindrical encompass such other approximate shapes.

The cylindrical surface 89 has a central axis. The portion of the cylindrical surface on one side of the axis is symmetrical with the portion of the cylindrical surface on the other side of the axis.

The fifth and sixth surfaces 87, 89 can be wrapped around a base curve, in accordance with conventional optical industry practice. This allows the lens element to have more curvature thereto befitting use of the lens by the eye. The sphere would be more spherical and the cylinder would be toroidal.

Figure 4:
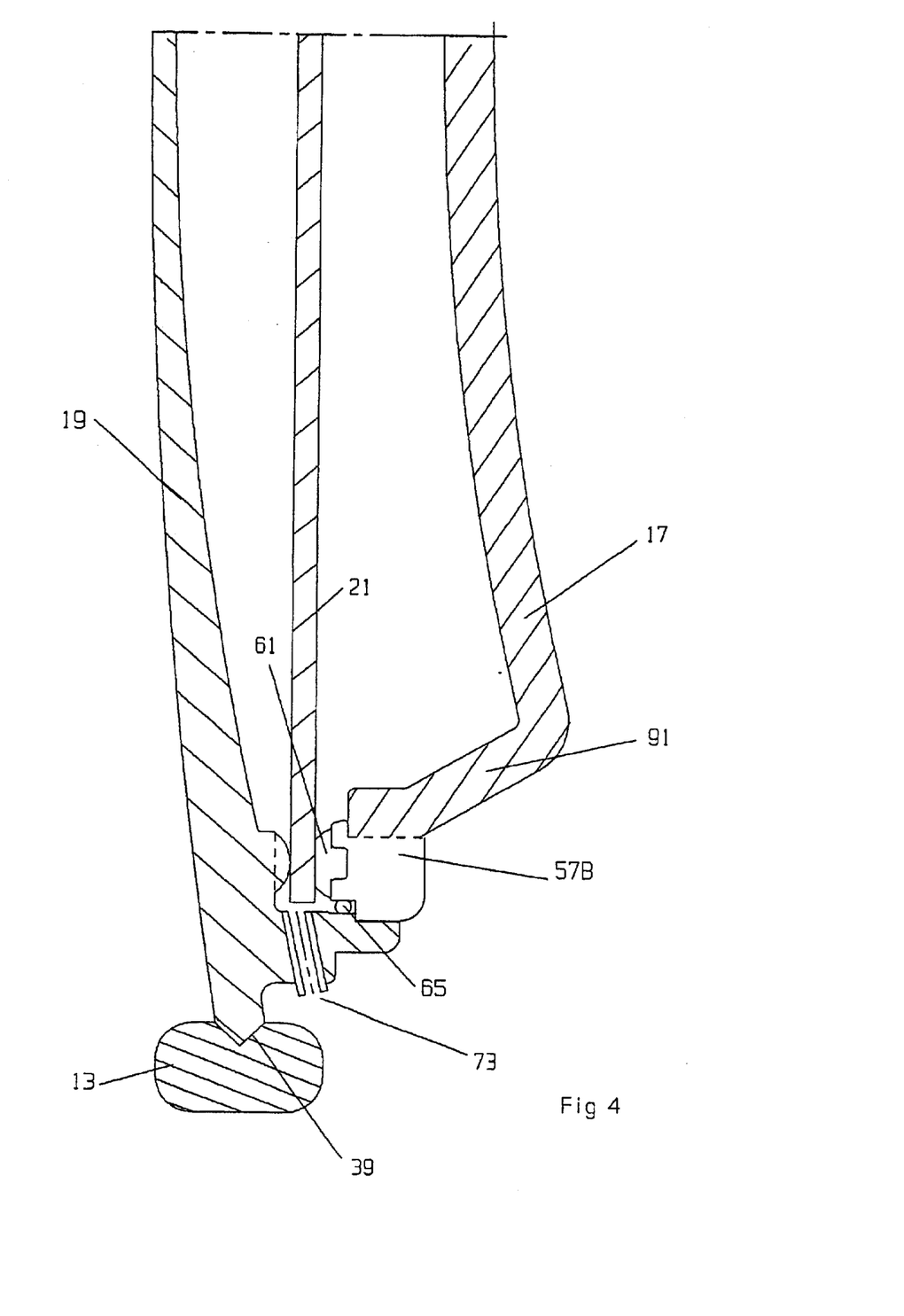
FIG. 4 is a cross-sectional detail view of the lens arrangement, in accordance with still another embodiment.
Figure 5:
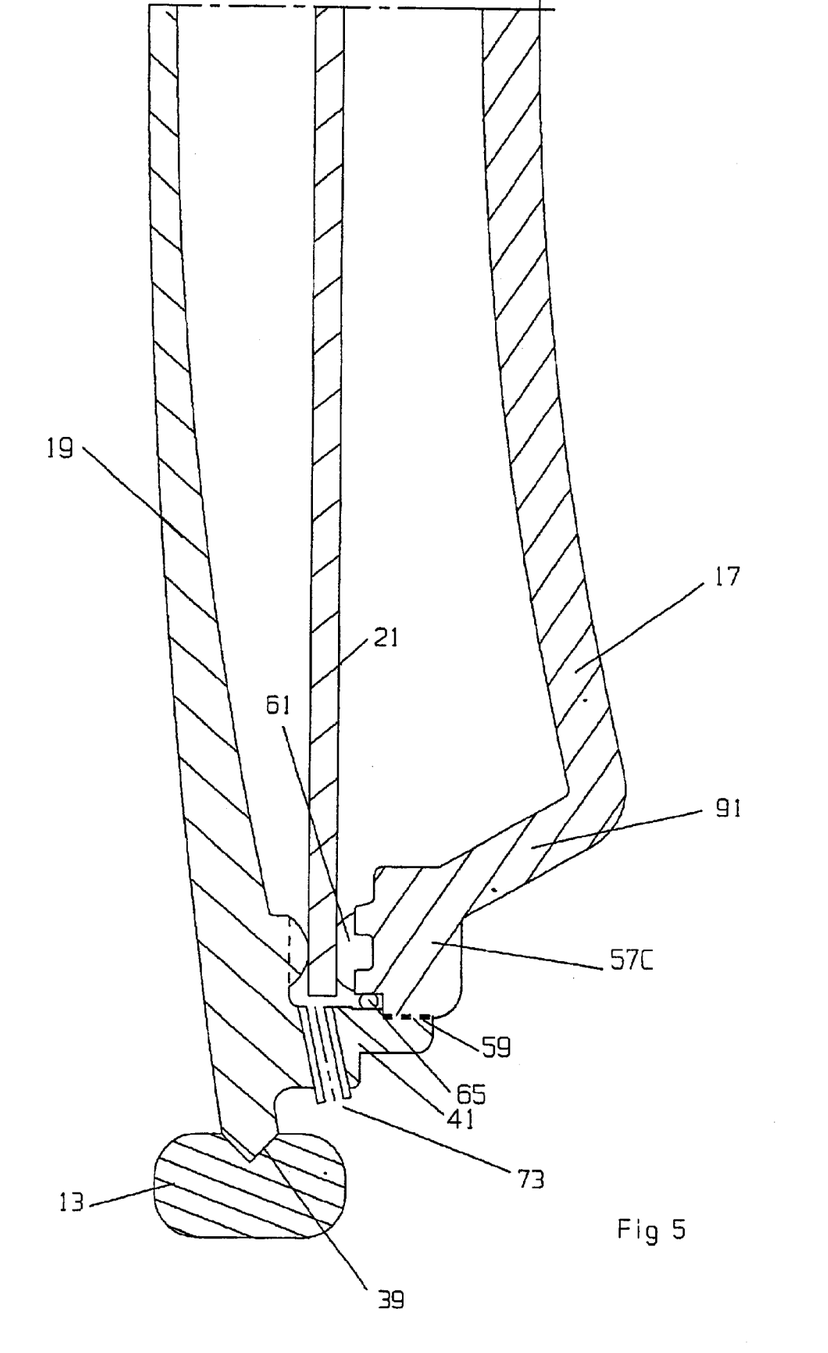
FIG. 5 is a cross-sectional detail view of the lens arrangement, in accordance with still another embodiment.

Along the edge of the fifth and sixth surfaces 87, 89 is a lip 91 that projects somewhat axially and radially outward from the fifth surface 87. The lip 91 couples to the ring member 57. In the preferred embodiment, the lip 91 and the ring member 57 are coupled together by threads 93 (FIG. 2). This has an advantage in that the axis of the cylindrical sixth surface 89 can be rotated to adjust for the wearer's astigmatism. In addition, the prescription lens can be removed without disturbing the seals 61, 65 around the fluid cell 15. Alternatively, the lip 91 can be coupled to the ring 57B by adhesive (see FIG. 4). This has an advantage of allowing the ring and the circumference of the prescription lens 17 to be noncircular. As still another alternative, the ring 57C can be integral to the prescription lens 17 (FIG. 5).

The prescription lens 17 is also made of a transparent material such as glass or plastic. The prescription lens can be ground and polished in accordance with conventional techniques, or it can be molded, or a combination of both processes.

Figure 6:
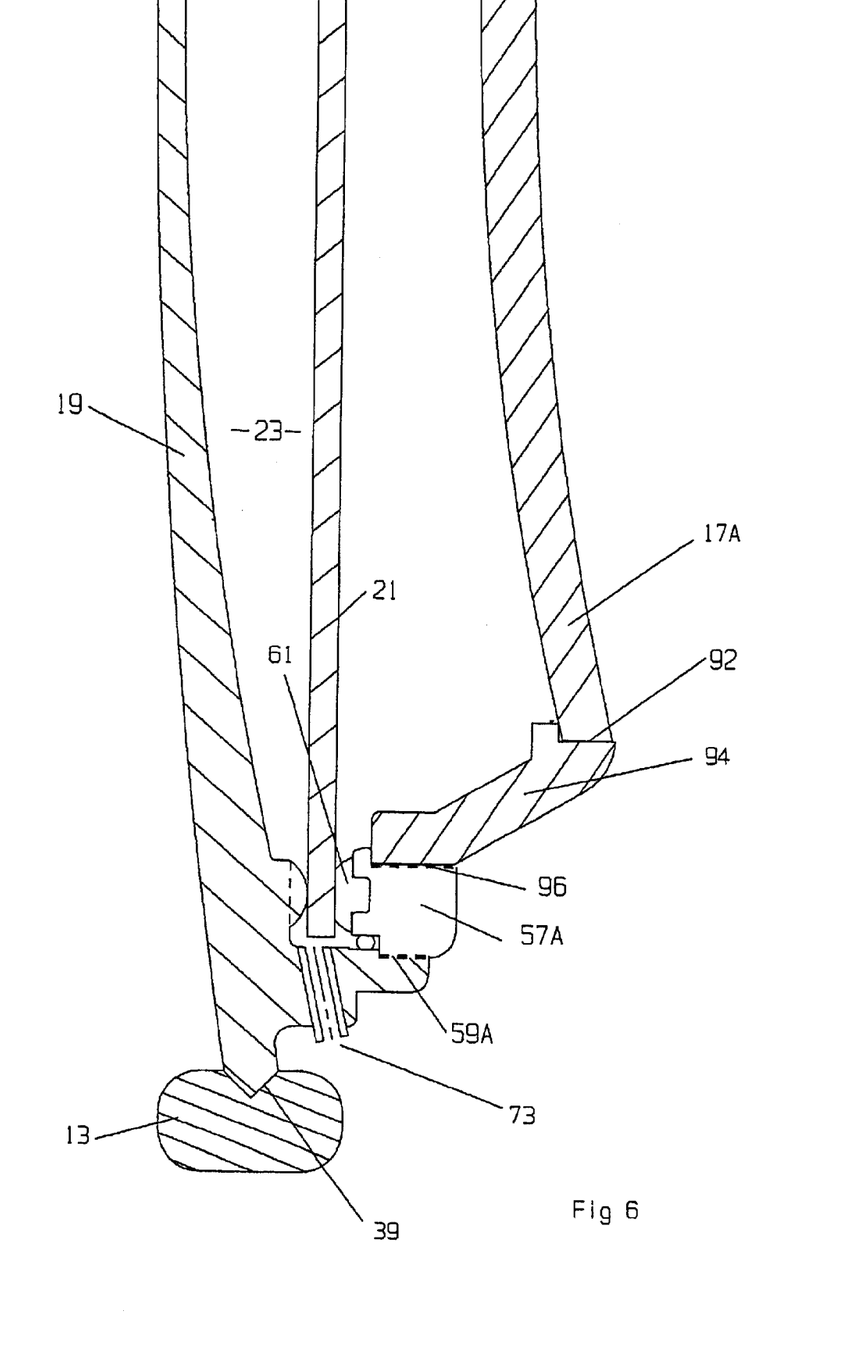
FIG. 6 is a cross-sectional detail view of the lens arrangement, in accordance with still another embodiment.

FIG. 6 shows the prescription lens 17A in accordance with another embodiment. The prescription lens 17A is a conventional and commercially available ophthalmic lens, such as the type used in conventional frame eyewear. The lens 17A is made as in accordance with conventional practice. Then, the edge 92 is ground and placed into an adapter 94. An adhesive can be used to retain the lens 17A in the adapter. The adapter 94 is in turn coupled to the ring 57A by threads 96. Thus, the prescription lens 17A can be rotated to orient the cylinder.

The use of an adapter, as shown in FIG. 6, has the advantage of being able to use a relatively inexpensive prescription lens, instead of a customized lens.

The lens arrangement 11 is assembled as follows (with reference to FIGS. 1 and 2). The membrane 21 is placed into the base 19 so that the edge portion 49 of the membrane contacts the base projection 43. The ring member 57 is then coupled to the base 19. The seal 61 contacts the edge portion 49 of the membrane 21, to form a fluid tight seal. In the embodiment shown in FIG. 2, the ring 57 is threaded into the lip 41. Fluid 23 is injected into the fluid cell 15 through the inlet passage 67 while the air inside of the cell is allowed to escape through the outlet passage 69. Fluid is injected until the fluid cell is completely full of fluid. The prescription lens 17 is coupled to the ring member 57. The edge of the base 19 is ground, beveled and fit into the frame 13. Grinding and beveling of the edge of the base can occur before attaching the membrane and prescription lens.

The wearer's eye is located closest to the sixth surface 89 of the prescription lens 17. Thus, the prescription lens is interposed between the fluid cell 15 and the eye.

If the prescription lens 17 has a cylindrical surface, then the lens is rotated to the proper orientation. If the prescription lens changes, then the old prescription lens is removed and the new one is coupled to the ring (for the configurations of FIGS. 1–4 and 6) or to the lip 41 of the base (for the configuration of FIG. 5). Thus, the wearer is able to use the existing frame, base, etc. Also, the prescription lens need not be edge ground and beveled to fit within the frame, resulting in a cost savings.

The corrective power of the lens arrangement 11, which includes the fixed prescription lens 17, can be modified with the fluid cell. Adding or removing fluid 23 from the cell produces a change in the overall corrective power of the lens arrangement. Adding fluid to the fluid cell 15 forms a more positive lens of the fluid. The fluid lens is formed by the base second surface 35 and the membrane third surface 51. The fluid lens thus combines with the prescription lens 17 to provide more corrective power. Removing fluid from the fluid cell forms a more negative lens of the fluid. The fluid lens thus combines with the prescription lens to provide less corrective power. Thus, the fluid cell provides variable focus over a wide range of diopters to the lens arrangement.

The membrane 21 can flex from its neutral position either toward or away from the lens 17. Flexing toward the lens 17 produces a more positive lens, while flexing away from the lens 17 produces a more negative lens.

It is preferable, although not necessary to provide a null corrective power for the fluid cell, and that this null corrective power be obtained when the membrane is in a neutral position. The membrane 21 is in a neutral position when the pressures on both of its surfaces is equal, as shown in FIG. 1. A loss of controlled pressure in the fluid cell results in the membrane occupying the neutral position.

A null corrective power is obtained by considering: the curvature of the first and second surfaces of the base 19, the separation between the base and the membrane 21, the thickness of the membrane, and the respective indices of refraction of the base, fluid and membrane. For example, the curvature of the first surface 33 of the base 19, the thickness of the membrane 21, the indices of refraction of the base 19, the membrane 21 and the fluid could be chosen arbitrarily, and then the curvature of the second surface 35 of the base and the separation can be determined. The curvature of the second surface 35 of the base is selected depending on the curvatures of the first surface 33 of the base and the membrane third and fourth surfaces 51, 53 so as to provide a null corrective power. The provision of a null corrective power is a safety feature. If the fluid cell loses pressure, then the wearer can at least look through the lens arrangement with the original corrective power of the prescription lens. If the fluid is drained from the cell, the person will be looking through the base 19, which is a negative lens, focusing on objects at a greater distance. This is a fail safe mode, as losing fluid and focusing on near objects could present problems to the wearer.

The lens arrangement 11 only has two exposed surfaces, namely the base first surface 33 and the prescription lens sixth surface 89. The other surfaces are protected from dust, debris, oils and greases. The two exposed surfaces can be easily cleaned.

The lens arrangement can be disassembled for maintenance. Also, any of the first through sixth surfaces 33, 35, 51, 53, 87, 89 can be used for coatings, shadings and polarizing.

Figure 8:
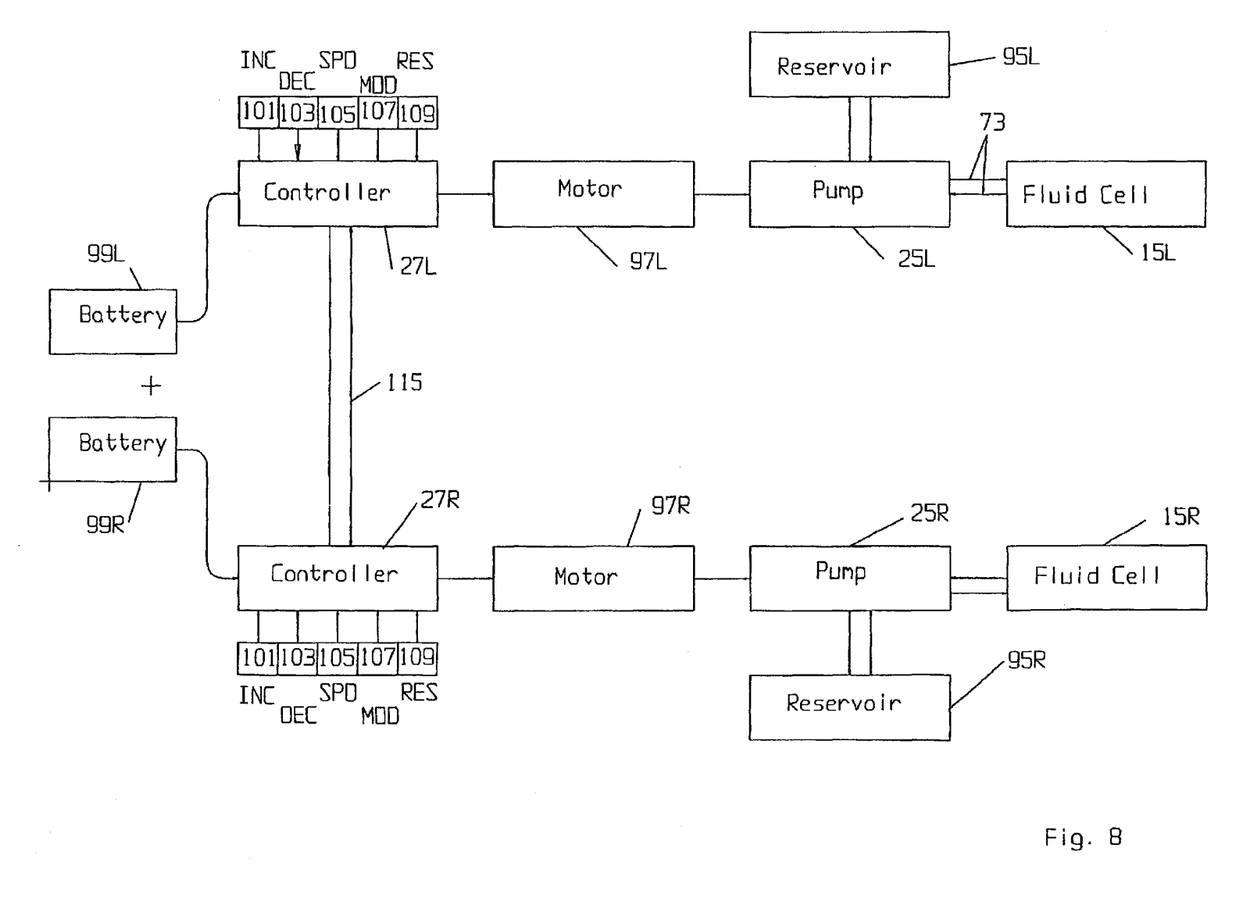
FIG. 8 is a schematic block diagram showing a pump and controller arrangement for a pair of eyeglasses.

The pump and controller mechanism is shown in FIG. 8. The pump mechanism is used to introduce or withdraw fluid from a fluid cell 15.

For a single fluid cell, the pump and controller mechanism includes the pump 25, a motor 97, the controller 27, and a battery 99. (In FIG. 8, the components are shown with a number followed by L or R, for left or right.) In a preferred embodiment involving eyewear, there is a left lens arrangement with a left fluid cell 15L and a right lens arrangement with a right fluid cell 15R. One way to provide independent operation of the two fluid cells relative to each other is shown in FIG. 8. For the left fluid cell 15L, there is a left pump 25L, a left reservoir 95L, a left motor 97L and a left controller 27L, while for the right fluid cell 15R, there is a right pump 25R, a right reservoir 95R, a right motor 97R and a right controller 27R. The controllers 27L, 27R each have a battery 99L, 99R.

Each pump 25L, 25R controls the flow of fluid between the respective reservoirs and the respective fluid cell. In the preferred embodiment, the pumps are positive displacement pumps that each operate on a flexible tubing between the respective reservoir 95L, 95R and the respective fluid cell 15L, 15R. Each pump is operated by a respective motor 97L. Each motor is in turn operated by a respective controller 27L, 27R. Other types of pumps can be utilized.

An example of a positive displacement pump is shown and discussed in Floyd, U.S. Pat. No. 5,684,637. When the pump is operated by the motor, rollers press on flexible tubing, which flexible tubing extends from the reservoir to the tube 73 of the fluid cell. If the rollers move toward the fluid cell, fluid is pumped out of the reservoir and into the fluid cell. If the rollers move toward the reservoir, fluid is pumped out of the fluid cell and into the reservoir. The reservoir stores a quantity of fluid. The connection between the motor and pump prevents backdriving of the pump when the motor is not driving.

In the pumping scheme described above, one passage to the fluid cell can carry fluid to and from the cell. The other passage carries gases and fluid from the cell. It is possible to operate with one passage but when doing so, gases are not removed from the cell. The connection between the pump and cells involves check valves 77 (see FIG. 1) to determine the direction of flow.

Each controller 27 includes a microprocessor (see FIG. 8). Alternatively, a mask ROM version of a microprocessor can be used, in order to permit the use of lower supply voltage and a reduced battery requirement. Each controller 27 also includes an oscillator for timing signals, an output connected to the respective motor 97, and an input/output channel 115 connected to the other controller. The input/output channel 115 is a two wire channel.

In addition, each controller has five switches 101, 103, 105, 107, 109 connected thereto, which switches provide inputs. The operator, or eyewear wearer, utilizes these switches to adjust the fluid cells. The switches control the direction of the respective motor rotation (clockwise or counterclockwise), the duration of the motor rotation when energized and the speed that the motor rotates. Furthermore, when one controller is commanded to operate both sides, it operates its own side and sends a signal to the other controller to operate the other side. When a controller is commanded to operate only its own side, it does not send a signal to the other controller.

The switches are as follows: an increase switch 101, a decrease switch 103, a mode switch 107, and a resolution switch 109.

The switches 101, 103, 107 and 109 are normally open momentary closure switches. Thus, the switches are pressed to closed.

The increase and decrease switches 101, 103 control the direction that the motor 97 rotates. One switch, when closed, causes the motor to rotate clockwise. The other switch, when closed, causes the motor to rotate counterclockwise. For example, the increase switch 101 causes the motor 97 to rotate clockwise, wherein fluid is pumped into the fluid cell. This causes the membrane 21 to flex toward the prescription lens 17. Conversely, the decrease switch 103 causes the motor to rotate counterclockwise, wherein fluid is pumped out of the fluid cell. This causes the membrane 21 to flex toward the base 19.

When either the increase or the decrease switches 101, 103 are closed, the motor rotates in the specified direction for a predetermined amount of time. Thus, for each closure operation of the increase and decrease switches 101, 103, a predetermined amount of fluid is pumped into or out of the fluid cell.

The predetermined run time for the motor is:

$$\text{Run Time} = \text{Pulses} * N,$$

where N is the number of pulses. Each pulse has a duration of, for example, 128 milliseconds.

The run time is changed by pressing the resolution switch 109. Then, the resolution is increased or decreased by pressing the increase switch 101 or the decrease switch 103. Each operation of a switch 101, 103 changes N by an increment.

To maintain a resolution setting, the resolution switch 109 is pressed again. Then, use of the increase and decrease switches 101, 103 will move fluid in and out of the cell.

The eyewear can be configured to have the left pump and controller mechanism in the left earpiece and the right pump and controller mechanism in the right earpiece. Many people have a dominant hand, either being right or left handed. The present invention allows the wearer to control both fluid cells from a single side.

To accomplish such dual control, the mode switch 107 is used. Pressing the mode switch toggles between two modes, namely single and dual. In the single mode, the controller operates only its respective fluid cell pump. In the dual mode, the controller operates its respective fluid cell pump and signals the other controller which controls the pump for the other fluid cell. For example, in the dual mode, the right controller 27R can be used to pump fluid in or out of both of the right and left fluid cells 15R, 15L. The signals from the right controller are passed over the input/output channel 115 to the left controller. The right and left pumps 25R, 25L are operated in identical manners. To change modes, the mode switch 107 is pressed.

Although the lens arrangement has been described as having the base 19 incorporated into a separate frame 13, the base could form the frame in an integral part.

Figure 9:
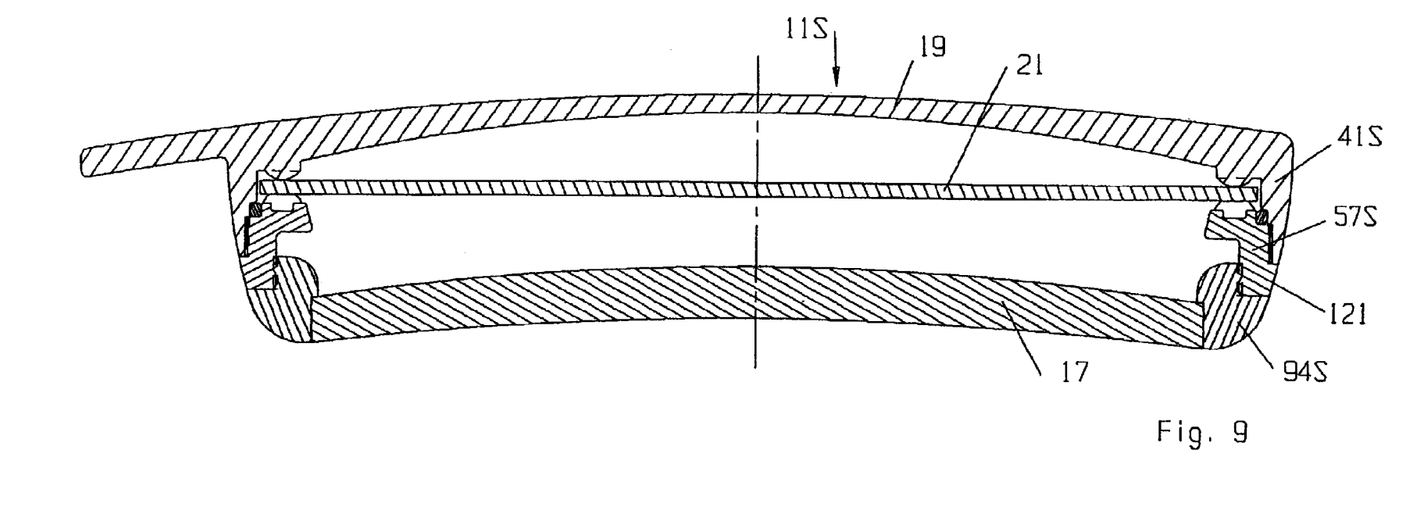
FIG. 9 is a cross-sectional view of the lens arrangement, in accordance with a preferred embodiment.

FIG. 9 shows a lens arrangement 11 S in accordance with another embodiment. The lens arrangement is designed to form a significant portion of a comfortable frame. One side forms a smooth curved surface 121 for bearing on the side of a human's nose. Specifically, the base lip 41 S, the ring 57S and the adapter 94S all form the smooth surface 121. In the preferred embodiment, the smooth surface may be spherical or toroidal.

The lens arrangement 11 S of FIG. 9 is paired with a similar, but opposite lens arrangement to form a complete pair of eyewear.

The foregoing disclosure and the showings made in the drawings are merely illustrative of the principles of this invention and are not to be interpreted in a limiting sense.

What is claimed is:

1. A lens arrangement for use in applying a corrective power, comprising:
    a) a fluid lens cell having a chamber formed by first and second lens elements, the chamber being sealed by a seal and containing a transparent fluid, the first and second lens elements being made of a transparent material, one of the first or second lens elements being flexible the flexible one of the first or second lens elements having an edge portion that extends around a periphery of said respective lens element and also a center portion, said edge portion being clamped between two rings so as to pivot freely between the two rings as the center portion of the flexible one of the first or second lens element flexes due to changes in the fluid in the chamber;
    b) a passage coupled to the fluid lens cell so as to allow communication with the chamber, the passage providing for flow of the fluid therethrough so that the volume of the chamber can be changed;
    c) a rigid third lens element having first and second surfaces that are shaped to provide optical correction, the third lens element being removably coupled to an exterior of the fluid cell so as to be adjacent to the fluid cell and optically aligned with the fluid cell.

2. The lens arrangement of claim 1 wherein the fluid cell is capable of providing a null correction.

3. The lens arrangement of claim 2 wherein the fluid cell provides a null correction when the flexible first or second lens element is unflexed.

4. The lens arrangement of claim 3 wherein at least one of the first or second lens elements comprises a negative lens.

5. The lens arrangement of claim 1 wherein the flexible one of the first or second lens elements comprises a membrane and the third lens element is adjacent to the membrane, there being a space between the third lens element and the membrane to allow the membrane to flex.

6. The lens arrangement of claim 1 wherein one of the first or second surfaces of the third lens element is spherical and the other of the first or second surfaces is cylindrical.

7. The lens arrangement of claim 1 wherein one of the first or second surfaces of the third lens element is cylindrical, and has a cylindrical axis, the third lens element being rotatable relative to the fluid cell so as to vary relative to the cylindrical axis orientation.

8. The lens arrangement of claim 1 wherein the first and second lens elements each have two surfaces, with at least one of the surfaces of the first, second or third lens elements being coated, shaded or polarized.

9. The lens arrangement of claim 1 wherein the flexible one of the first or second lens elements comprises a membrane, the membrane having two flat surfaces.

10. The lens arrangement of claim 1 wherein the flexible one of the first or second lens elements comprises a membrane, the membrane having two surfaces, with one of the membrane surfaces being curved when the membrane is unflexed.

11. The lens arrangement of claim 1 wherein the third lens element is coupled to the fluid cell independently of the fluid lens seal, wherein the third lens element can be removed from the lens arrangement without disturbing the seal.

12. The lens arrangement of claim 11 wherein the third lens element is rotatably coupled to the fluid lens cell.

13. The lens arrangement of claim 1 wherein:
    a) the third lens element comprises a prescription lens;
    b) the third lens element is coupled to the fluid cell by way of an adapter which is structured and arranged for receiving the third lens element.

14. The lens arrangement of claim 13 further comprising a frame, wherein the adapter and the fluid cell form a smooth surface for bearing on the nose of a human.

15. The lens arrangement of claim 1 wherein the passage is through one of the rings.

16. A lens arrangement for use in applying a corrective power, comprising:
    a) a rigid base having first and second surfaces;
    b) a flexible membrane having third and fourth surfaces, the second surface of the base and the third surface of the membrane being adjacent to each other and forming a chamber therebetween, the membrane having an edge portion and a center portion, the edge portion being coupled to the base being clamped between two rings so as to pivot freely between the rings as the center portion of the membrane flexes;
    c) the chamber being sealed and containing a transparent fluid;
    d) the base and the membrane being made of transparent materials and forming a fluid cell;
    e) a passage providing communication between the chamber and the exterior of the fluid cell so as to allow the amount of fluid within the chamber to be changed;
    f) a corrective lens element having fifth and sixth surfaces that are shaped to provide optical correction, the corrective lens element being removably coupled to the base so as to be adjacent to the fluid cell.

17. The lens arrangement of claim 16 wherein the corrective lens element is rotatably coupled to the base.

18. The lens arrangement of claim 16 wherein one of the fifth or sixth surfaces of the corrective lens element is spherical and the other of the fifth or sixth surfaces is cylindrical.

19. The lens arrangement of claim 16 wherein the corrective lens element is coupled to the base by way of a ring member.

20. The lens arrangement of claim 19 wherein the membrane edge portion being pivotally coupled between the base and the ring member.

21. The lens arrangement of claim 16 wherein the corrective lens element is adjacent to the membrane.

22. The lens arrangement of claim 16 wherein one of the third or fourth surfaces of the membrane is spherical.

23. The lens arrangement of claim 16 wherein the first and second surfaces of the base, the fluid and the third and fourth surfaces of the membrane form a null correction when the membrane is in an unflexed position.

24. The lens arrangement of claim 23 wherein the base comprises a negative lens.

25. The lens arrangement of claim 16 wherein the base is mounted into an eyewear frame.

26. The lens arrangement of claim 16 wherein the passage is through one of the rings.

27. The lens arrangement of claim 16, wherein:
   a) one of the fifth or sixth surfaces of the corrective lens element is spherical;
   b) the other of the fifth or sixth surfaces of the corrective lens element is cylindrical, the corrective lens element being rotatably coupled to the base;
   c) one of the third and fourth surfaces of the membrane is spherical;
   d) the first and second surfaces of the base, the fluid and the third and fourth surfaces of the membrane form a null correction when the membrane is in an unflexed position;
   e) the base is mounted into an eyewear frame.

28. An arrangement of lenses, comprising:
   a) a first lens and a second lens;
   b) each of the first and second lenses comprising a fluid lens cell having a chamber formed by first and second lens elements, the chamber being sealed by a seal and containing a transparent fluid, the first and second lens elements being made of a transparent material, one of the first or second lens elements being flexible;
   c) each of the first and second lenses comprising a passage coupled to the fluid lens cell so as to allow communication with the chamber, the passage providing for flow of the fluid therethrough so that the volume of the chamber can be changed;
   d) the passage communicating with a fluid pump, the pump being controlled by a controller;
   e) one of the first lens controller or the second lens controller selectively controlling one or both of the first lens pump and the second lens pump.

29. The arrangement of lenses of claim 28 wherein each of the first and second lenses comprise a rigid third lens element having first and second surfaces that are shaped to provide optical correction, the third lens elements being removably coupled to an exterior of the fluid cell so as to be adjacent to the fluid cell and optically aligned with the fluid cell.

* * * * *